United States Patent
Borgaonkar et al.

(10) Patent No.: US 8,161,415 B2
(45) Date of Patent: Apr. 17, 2012

(54) METHOD, ARTICLE, APPARATUS AND COMPUTER SYSTEM FOR INPUTTING A GRAPHICAL OBJECT

(75) Inventors: Shekhar Ramachandra Borgaonkar, Bangalore (IN); Prashanth Anant, Bangalore (IN); Prasenjit Dey, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 724 days.

(21) Appl. No.: 11/916,290

(22) PCT Filed: Jun. 20, 2005

(86) PCT No.: PCT/IN2005/000210
§ 371 (c)(1),
(2), (4) Date: May 27, 2008

(87) PCT Pub. No.: WO2006/137078
PCT Pub. Date: Dec. 28, 2006

(65) Prior Publication Data
US 2009/0138830 A1 May 28, 2009

(51) Int. Cl.
*G06F 3/033* (2006.01)
(52) U.S. Cl. ......... 715/863; 715/816; 715/835; 715/840
(58) Field of Classification Search .................. 715/808, 715/863, 816, 835, 840
See application file for complete search history.

(56) References Cited

U.S. PATENT DOCUMENTS

| 5,805,167 | A | * | 9/1998 | van Cruyningen | ........... 715/808 |
| 6,094,197 | A | | 7/2000 | Buxton et al. | |
| 6,097,392 | A | | 8/2000 | Leyerle et al. | |

FOREIGN PATENT DOCUMENTS

| EP | 0635780 | 1/1995 |
| EP | 0661619 | 7/1995 |
| EP | 1383034 | 1/2004 |

* cited by examiner

*Primary Examiner* — Andrey Belousov

(57) ABSTRACT

Method, article, apparatus and computer system facilitating the easy and intuitive inputting of a desired graphical object into an electronic system from a large plurality of predetermined graphical objects. In one example embodiment, this is achieved by assigning each of said graphical objects into one of a plurality of groups in accordance with a predetermined similarity criterion, associating respective base shapes to each of said groups, wherein said base shapes having a certain degree of similarity to the objects assigned to the associated group according to said similarity criterion and associating in each of said groups at least one gesture to each of said graphical objects, so that the associated gestures are distinguishable from each other. In order to input the desired graphical object, one of the groups is selected by selecting its base shape and then the desired graphical object is identified by drawing the respective gesture associated thereto.

32 Claims, 7 Drawing Sheets

METHOD, ARTICLE, APPARATUS AND COMPUTER SYSTEM FOR INPUTTING A GRAPHICAL OBJECT

TECHNICAL FIELD OF THE INVENTION

The present invention relates generally to a user interface of electronic systems, and more particularly relates to inputting a desired graphical object from a large plurality of predetermined graphical objects.

BACKGROUND OF THE INVENTION

Data entry into computers is performed using keyboards and different cursor directing devices. Graphical objects, such as geometrical shapes (lines, triangles, quadrangles, polygons, circles, ellipses, etc.), arrows, stars, flowchart symbols, mathematical symbols, clipart, etc., are usually entered by means of the latter. Traditional cursor directing devices include different mice and trackballs. In the last few years digitizing tablets have become more and more popular among users.

There are known methods for inputting character data into electronic systems by means of gesture-selection via a digitizing tablet. For example, Hewlett-Packard's 'Letter Recognizer' writing software application uses gestures for character input.

However, in case of the known computer systems graphical objects cannot be inputted by means of gesture-selection. For example, when using the drawing tools of MS Word™, which constitute one of the most frequently used vector graphical editor of our time, the graphical objects are selected by tapping (clicking) on several menu items and then by dragging the pointer across a portion of the screen to define the location and the size of the selected object. There are more than one hundred possible graphical objects even if one does not count clipart objects that can be inserted just like any other graphical objects. Therefore it is quite cumbersome to enter graphical objects because of the complex sequence of operations and clicks that one has to perform to select the desired object.

There is a need to facilitate easy and intuitive inputting of graphical objects into electronic systems from a large plurality of predetermined graphical objects via digitizing tablets, i.e. devices that can translate natural gestures of the users into computer-interpretable data, and the object of the invention is to satisfy this need in a simple and efficient and user-friendly way, wherein the selection operation does not require extra attention or effort by the user.

SUMMARY OF THE INVENTION

An embodiment of the invention includes a method for inputting a desired graphical object from a large plurality of predetermined graphical objects. This method includes the step of preparing said graphical objects for gesture-selection. Said preparation includes the steps of assigning each of said graphical objects into one of a plurality of groups in accordance with a predetermined similarity criterion, wherein the number of said groups is much less than the number of said graphical objects, associating respective base shapes to each of said groups, wherein said base shapes have a certain degree of similarity to the objects assigned to the associated group according to said similarity criterion, associating in each of said groups at least one gesture to each of said graphical objects, so that within any group the associated gestures are distinguishable from each other and electronically storing said assignments of said graphical objects to said groups and for each group said association of said objects to said gestures. The method further includes the step of selecting said desired graphical object. Said selecting step includes the steps of selecting a base shape from the plurality of base shapes and defining thereby the group to which said desired graphical object is assigned, drawing a gesture on a digitizing tablet similar to the gesture associated with said desired graphical object, electronically recognizing which of said stored gestures belonging to the defined group is most similar to said drawn gesture, identifying the desired graphical object associated with said recognized gesture and generating the identified graphical object in electronic form.

BRIEF DESCRIPTION OF THE DRAWINGS

Embodiments of the invention will now be described, by way of example only, with reference to the accompanying drawings in which.

DETAILED DESCRIPTION OF THE INVENTION

In the following detailed description of the various embodiments, reference is made to the accompanying drawings, wherein the same reference numbers always refer to the same features. The drawings are shown by way of illustration of specific embodiments in which the invention may be practiced. However, it is to be understood that other embodiments may be utilized and that changes may be made without departing from the scope of the present invention. The following detailed description is, therefore, not to be taken in a limiting sense, and the scope of the present invention is defined only by the appended claims.

The term "digitizing tablet" refers to an input device for obtaining graphics input. It is connected to an electronic device, e.g. a computer and includes some form of a pen-like pointing device called stylus. The tablet has a flat surface with a defined active area, where the user can tap a certain point or draw a natural handwritten gesture by means of the pointing device. The flat surface along with the pen-like pointing device provides a more natural drawing motion for users to input data into a computer.

The word "stylus" when used in the specification and claims shall mean a position-designating device that is sensed by the digitizing tablet. For a standard electronic tablet this is a special pen while for a standard capacitive touchpad this is a finger. The stylus can be used to draw or trace images, which are then converted into digital data that can be processed by an electronic device, e.g. a computer.

The term "mouse mode" refers to a mode of operation of a digitizing tablet when the combination of the tablet and the stylus is used as a simple pointing device and the user can tap (i.e. click) a point on the tablet (and on the associated display) or drag objects across the tablet (display). In this mode the actual path of the stylus is not important but only the point where the tap occurred and the starting and ending points of the dragging movement, respectively.

The term "gesture mode" refers to a mode of operation of a digitizing tablet when the path of the stylus is stored in electronic ink format (i.e. time series of (x, y) coordinates) and the gesture engine of the tablet recognizes it as one of the predefined stored gestures.

The word "gesture" when used in the specification and claims shall mean a freehand movement of a user of an electronic system that can be captured and converted into electronic ink format by means of a digitizing tablet or other suitable electronic devices connected to or incorporated into said electronic system. The gesture can be continuous or can include several separate strokes. The electronic ink representation of the freehand movement can also be referred to as a "gesture".

Figure 1:
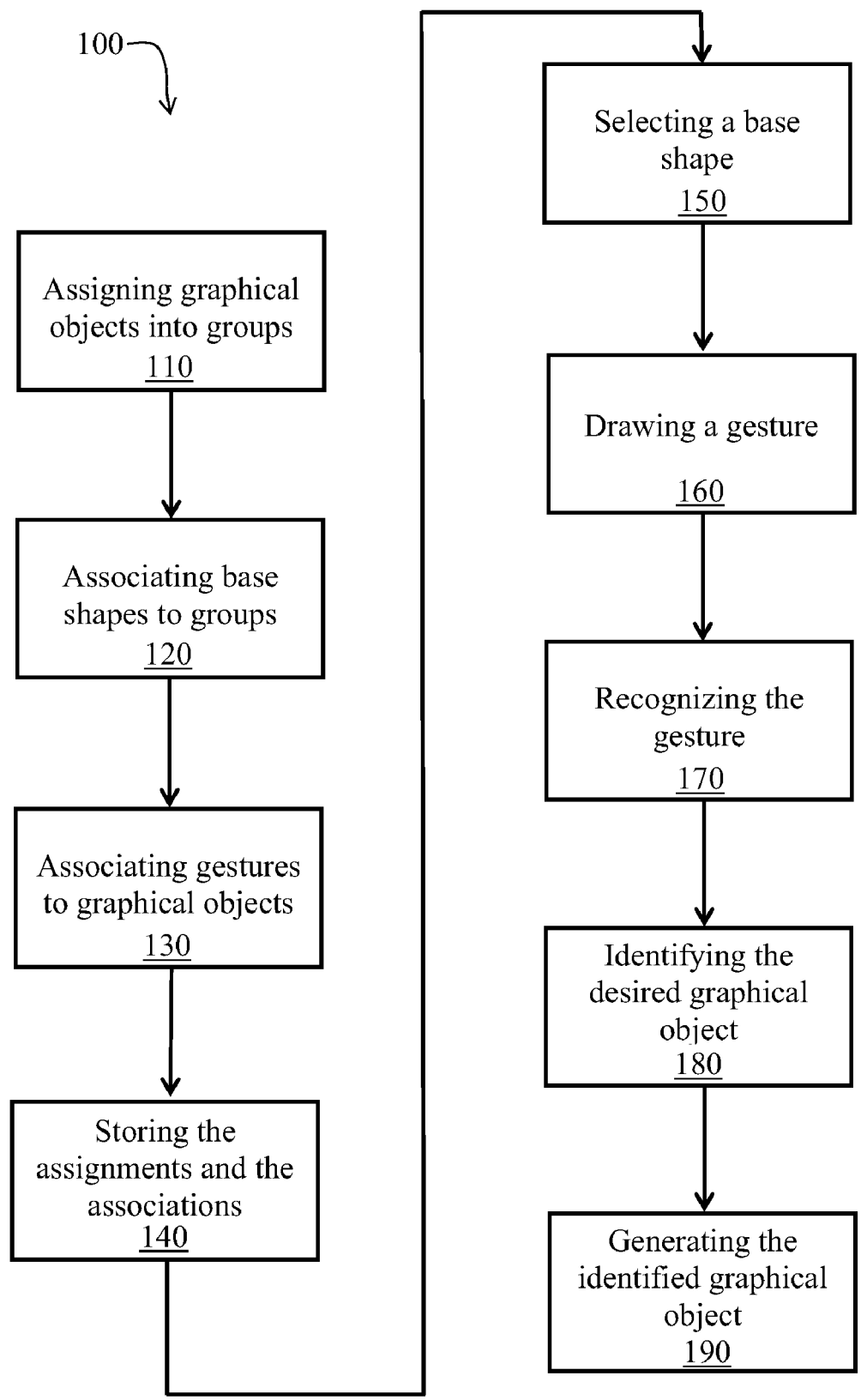
FIG. 1 is a flowchart illustrating an exemplary method of inputting a desired graphical object from a large plurality of predetermined graphical objects according to an embodiment of the present invention.

FIG. 1 illustrates an exemplary method 100 of inputting a desired graphical object from a large plurality of predetermined graphical objects by using a digitizing tablet by means of gesture-selection. First, said graphical objects are prepared for said selection. At step 110, this exemplary method 100 assigns each of said graphical objects into one of a plurality of groups in accordance with a predetermined similarity criterion. The number of said groups is much less than the number of said graphical objects.

At step 120 respective base shapes are associated to each of said groups, wherein said base shapes having a certain degree of similarity to the objects assigned to the associated group according to said similarity criterion. In some embodiments each graphical object in any given group is more similar to the base shape of that group than to the base shape of any other group. Moreover, the graphical objects in any given group are more similar to each other than to any graphical objects of any other group. These provisions help the user to easily find the desired graphical object, as he or she will quickly learn which base shape belongs to a particular graphical object due to the similarity of the graphical objects and the base shape belonging to the same group. Even an inexperienced user is able to make a guess with decent accuracy when choosing a base shape in order to enter the desired graphical object because of the similarity criterion used. Thus the similarity criterion is a subjective help for the user in memorizing the different assignments.

At step 130 in each of said groups at least one gesture is associated to each of said graphical objects, so that within any group the associated gestures are distinguishable from each other. Because the number of the graphical objects in any group is substantially less than the total number of all graphical objects, it is easier to find a set of distinguishable gestures that can be associated with the graphical objects in any particular group. Considering the large number of the graphical objects that can be inputted by the system, it would be practically impossible to define and to memorize as many gestures as the total number of all objects, therefore the assignment of gestures and objects in groups on the basis of a similarity criterion has reduced the number of gestures and simplified the task of the user. Preferably, the gesture or gestures associated with a graphical object is/are similar to that associated graphical object or a feature thereof. This option will also help the user to learn practicing the method, as the gestures that are used to select the desired graphical object will resemble the actual shape of this desired graphical object, therefore the user can easily memorize what gesture he should make. At step 140 the assignments of the graphical objects to their corresponding groups and in case of each group the association of the objects to the corresponding gestures are electronically stored.

After the preparatory steps, in the exemplary method 100 shown in the flow chart of FIG. 1 the next steps concern the selection of the desired graphical object. At step 150 that base shape is selected from the plurality of base shapes to which the desired graphical object is assigned and the group associated with this base shape is defined thereby. Then the user should make (draw) a gesture on the digitizing tablet at step 160, which gesture is similar to the gesture associated with the desired graphical object. Because of the similarity between the required gesture and the shape of the desired object, it will be easy for the user to memorize what gesture he has to make. Upon completion of the drawing of the gesture, at step 170 the system electronically recognizes which of the stored gestures of the selected group is most similar to the actually drawn gesture. Natural handwritten gestures can be recognized and compared with stored gestures by gesture-recognition methods known to those skilled in the art of pattern recognition. Possible examples include neural networks, radial basis functions, classification and regression trees, parametric Bayesian models, mixtures of experts and polynomial classifiers to name a few.

Following the selection/recognition of the stored gesture, in the exemplary method 100 the desired graphical object associated with the selected gesture is identified at step 180, and at step 190 the identified graphical object is generated in electronic form. In some embodiments in order to input further graphical objects, the selection of the graphical object, i.e. the steps 150 to 190 of the exemplary method 100 may be repeated as needed.

In some embodiments the generated graphical object is outputted to an electronic system for processing, which system may be a display device, a graphical processor or a printer. By outputting the generated graphical object to an electronic system (e.g. to a computing platform running a graphical editor application) it becomes possible to edit the graphical object. The user can modify the size, the orientation, the placement, the color, etc. of the just inputted graphical object by the standard functionalities of that particular editor, e.g. by using the digitizing tablet in its mouse mode.

In some embodiments, respective areas of an active region of the digitizing tablet are assigned to the base shapes, and the selection of one of the base shapes is carried out by activating the region belonging to the base shape to be selected. The activation is possible, by way of example, by tapping within the appropriate region of the active surface of the digitizing tablet or, preferably, by starting the drawing of the gesture within that respective region. When the latter option is used for the selection of the base shape, the user of the electronic system can effect the base shape selection and the drawing of the gesture in one step.

The method may further include the extraction of a predefined parameter—such as the size, the orientation or direction—of the drawn gesture in the recognizing step. This facilitates the generation of the desired graphical object in accordance with the extracted parameter. In addition to the main task of selection this way the user will also be able to perform some preliminary formatting work on the graphical object being inputted by utilizing certain parameters of the same gesture which has been used for the selection.

The gestures associated with the graphical objects may contain more than one continuous stroke drawn on the surface of the digitizing tablet. In an embodiment, the system can wait for the appearance of a next stroke for a predetermined time interval after the drawing of the previous stroke has been finished, and proceed to the recognition step only if no stroke has been received within this predetermined time interval.

To facilitate the gesturing of the user, the gesture, as it is being made, is displayed for the user in an embodiment. In that way the user can see his or her handwritten gesture, as would be the case when writing with a pen on paper.

Figure 2:
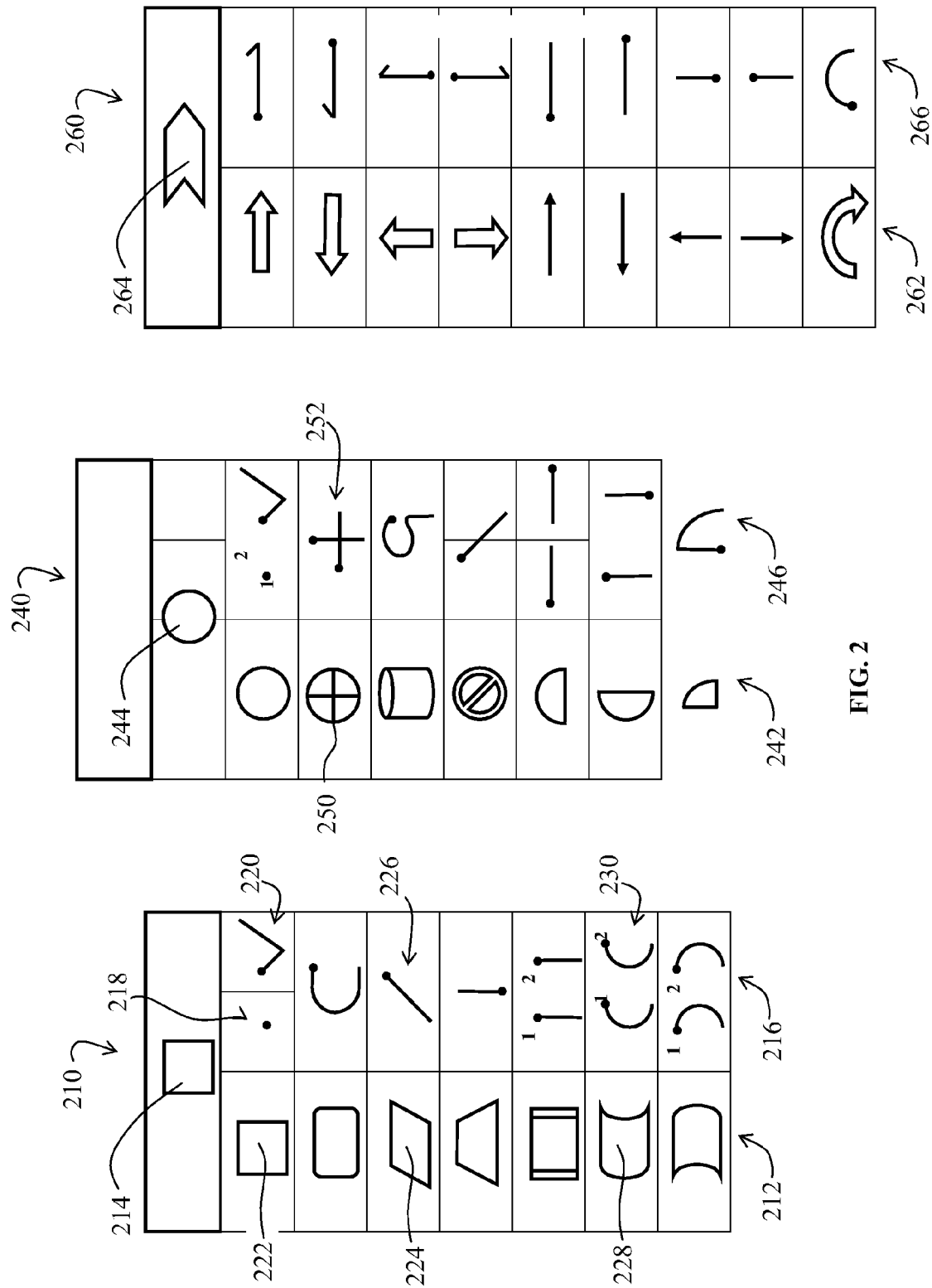
FIG. 2 is a schematic diagram that illustrates an example for a plurality of graphical objects assigned into three groups according to an embodiment of the present invention.

Referring now to FIG. 2, three exemplary groups 210, 240, 260 of graphical objects are shown. The first group 210 contains seven graphical objects (a square 222, a rectangle with rounded corners, a parallelogram 224, a trapezium, etc.) that can be seen in the first column 212 of the first table of the figure. One can establish, that all of the graphical objects in column 212 are in a certain way similar to each other, as they all resemble quadrangles. Therefore a square 214 is associated with this group 210 of graphical objects as a base shape. In the second column 216 of the table the gestures associated with the respective graphical objects can be seen. The black dots on the schematic illustration of the gestures always indicate the starting point of that particular gesture, e.g. there are two different gestures 218, 220, i.e. a selecting gesture 218 (a tap with the stylus on the digitizing tablet) and a check mark gesture 220 associated with the square 222. The other graphical objects in this group are only associated with one gesture per objects. The parallelogram 224 is associated with a gesture 226, namely, with a slanted line, which includes only one continuous stroke, but the rectangle 228 with rounded shorter sides is associated with a gesture 230 that includes two strokes, i.e. two "C" shaped lines. The small numbers besides the strokes of a multi-stroke gesture show the expected order of the strokes when they are drawn. It can be noted that the gestures are more or less similar to the associated graphical objects or a feature thereof so as to shorten the learning and memorizing period of the users. However in the case of the square 222, the gesture does not resemble the graphical object itself but it can be identified by the simple 'selecting' gestures 218, 220 because this graphical object is actually identical with the base shape of that group 210.

The second group 240 of graphical objects contains seven of the items (a circle, a circle 250 with two crossing lines inside, a cylinder, etc.) that can be seen in the first column 242 of the second table of FIG. 2. All of the graphical objects are similar to each other insofar they all resemble a circle in some way. The base shape associated with this group 240 of graphical objects is a circle 244. In the second column 246 of the table the gestures associated with the graphical objects can be seen. As to the gestures belonging to this group 240, the same things can be established as in case of the first group 210 i.e. the gestures always resemble the associated graphical objects.

Lastly, the third group 260 of graphical objects contains nine arrows of different kinds as can be seen in the first column 262 of the third table of FIG. 2. All of the graphical objects are similar to each other as all of them are certain kinds of arrows. The base shape associated with this group 260 is therefore an arrow 264. In the second column 266 of the table the gestures associated with the graphical objects of this group 260 can be seen. In this third group 260 all graphical objects are associated with one gesture and these gestures include only one stroke.

It can be noted, that the number of the graphical objects in each of the groups 210, 240, 260 (7, 7, 9) is much less than the total number of the graphical objects (23). It permits the association of easily distinguishable and easy to memorize gestures with the respective graphical object.

Figure 3:
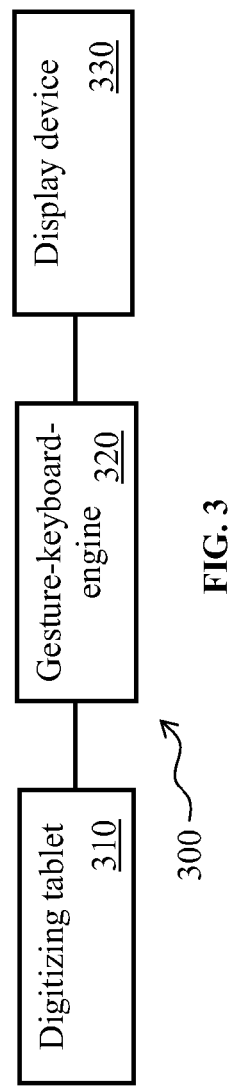
FIG. 3 is a schematic block diagram of an example of an apparatus for inputting a desired graphical object from a large plurality of predetermined graphical objects according to an embodiment of the present invention.

FIG. 3 illustrates a schematic block diagram of an exemplary apparatus 300 for inputting a desired graphical object from a large plurality of predetermined graphical objects according to an embodiment. The apparatus contains a digitizing tablet 310, a gesture-keyboard-engine 320 and a display device 330. Both the digitizing tablet 310 and the display device 330 is connected to the gesture-keyboard-engine 320.

Figure 4:
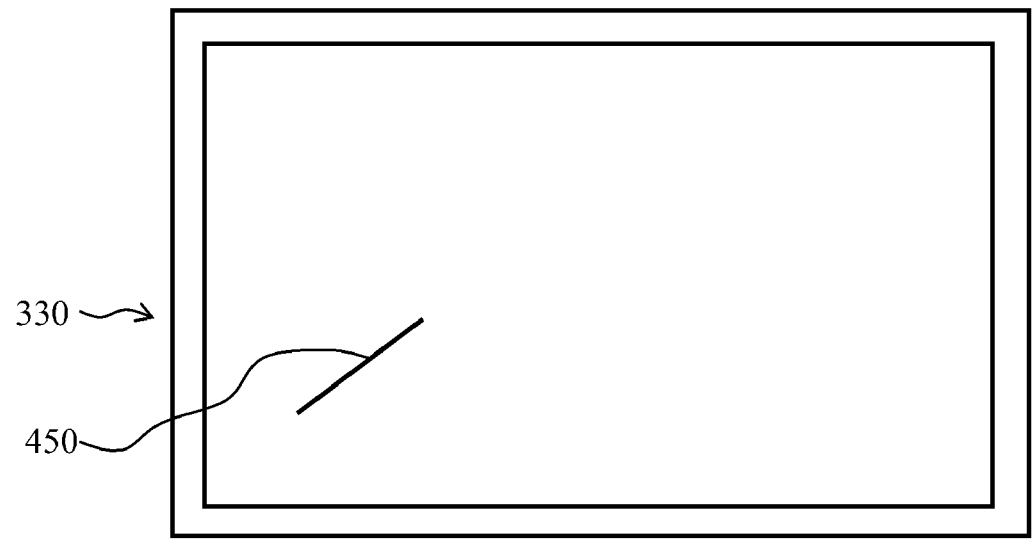
FIGS. 4 to 7 are representations that illustrate a sequence of graphical object inputs performed according to an embodiment of the present invention.
Figure 4:
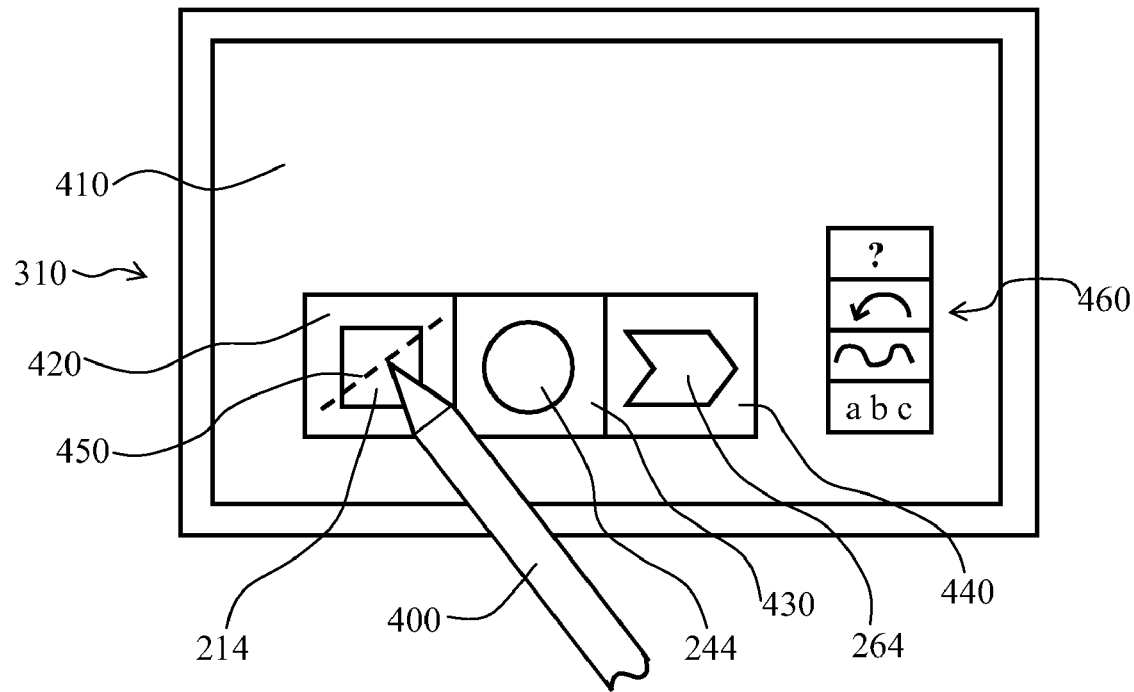

Referring now to FIG. 4, it shows schematically the digitizing tablet 310 and the display device 330. This latter device 330 is shown in a moment when a user is inputting a graphical object, e.g. a parallelogram using a stylus 400, and the digitizing tablet 310 has a predefined active surface 410. As shown in FIG. 4, in this embodiment the active surface 410 has a map of a gesture-board including regions 420, 430, 440 that are assigned to respective base shapes, i.e. the square 214, the circle 244 and the arrow 264, respectively, that are all displayed on the active surface 410 e.g. by means of an overlay. In other embodiments, the base shapes and the respective regions 420, 430, 440 can be displayed on the display device 330, e.g. on a computer monitor, a screen of a television set, a liquid crystal display, a plasma display, a touch screen and/or a display of a PDA device, a tablet PC, or other mobile computing or telecommunication devices.

Although in FIG. 4 the digitizing tablet 310 is shown as a stand-alone electronic tablet, it could be embodied by the touch sensitive surface of a PDA device, a tablet PC or a touch screen, to name a few possible options. As it will be appreciated, in some embodiments the display device 330 and the digitizing tablet 310 is the same device as in the case of a PDA device, a tablet PC or a touch screen. As one can envisage, this latter option would provide the user of the apparatus probably the most convenient way of operation.

In order to input the parallelogram (which constitutes now the desired graphical object), the user has to select the appropriate base shape (the square 214) and has to draw a gesture being similar to the gesture 226 (see FIG. 2) that is associated with the desired parallelogram 224. In this embodiment the user can do the two above acts in one step: he or she draws the respective gesture with its starting point within the desired region 420. In other embodiments, the selection of the base shape can be accomplished separately, e.g. by tapping within the appropriate region. Another option to select the base shape and to define the desired group thereby, is to assign respective keys on a keyboard to each of the base shapes instead of the regions of the active surface and to press that particular key on the keyboard in order to select the respective base shape (e.g. key 'S' for square). However, other techniques of base shape selection may easily be envisaged. Returning to the present embodiment, here the digitizing tablet 310 receives the selection of the base shape and defines thereby the group to which said desired graphical object is assigned and receives a gesture 450 drawn thereon by the user.

As shown in FIG. 4, as the user draws the gesture 450 on the surface of the digitizing tablet 310, the same is displayed on the display device 330 to give a feedback to the user concerning the gesture 450 just being drawn and to give a natural feeling of writing with a pen to facilitate easier entry of the gesture. (Please note that in FIGS. 4 and 6 the gestures drawn by the user onto the surface of the digitizing tablet 310 are shown by dashed lines because these strokes actually do not appear on the surface.) In this embodiment, when the user finishes his stroke with the stylus 400, the digitizing tablet 310 waits for a possible next stroke for a predetermined time interval. Because there is no further stroke to be received, the digitizing tablet 310 terminates the gesture input process after the predetermined time interval has elapsed. At this moment the display device 330 erases the gesture 450 drawn by the user as the gesture drawing has been terminated and the further displaying of the gesture has no further use. At the same time the digitizing tablet 310 sends the digital data associated with the defined group and with the gesture drawn and received to the gesture-keyboard-engine 320.

Figure 5:
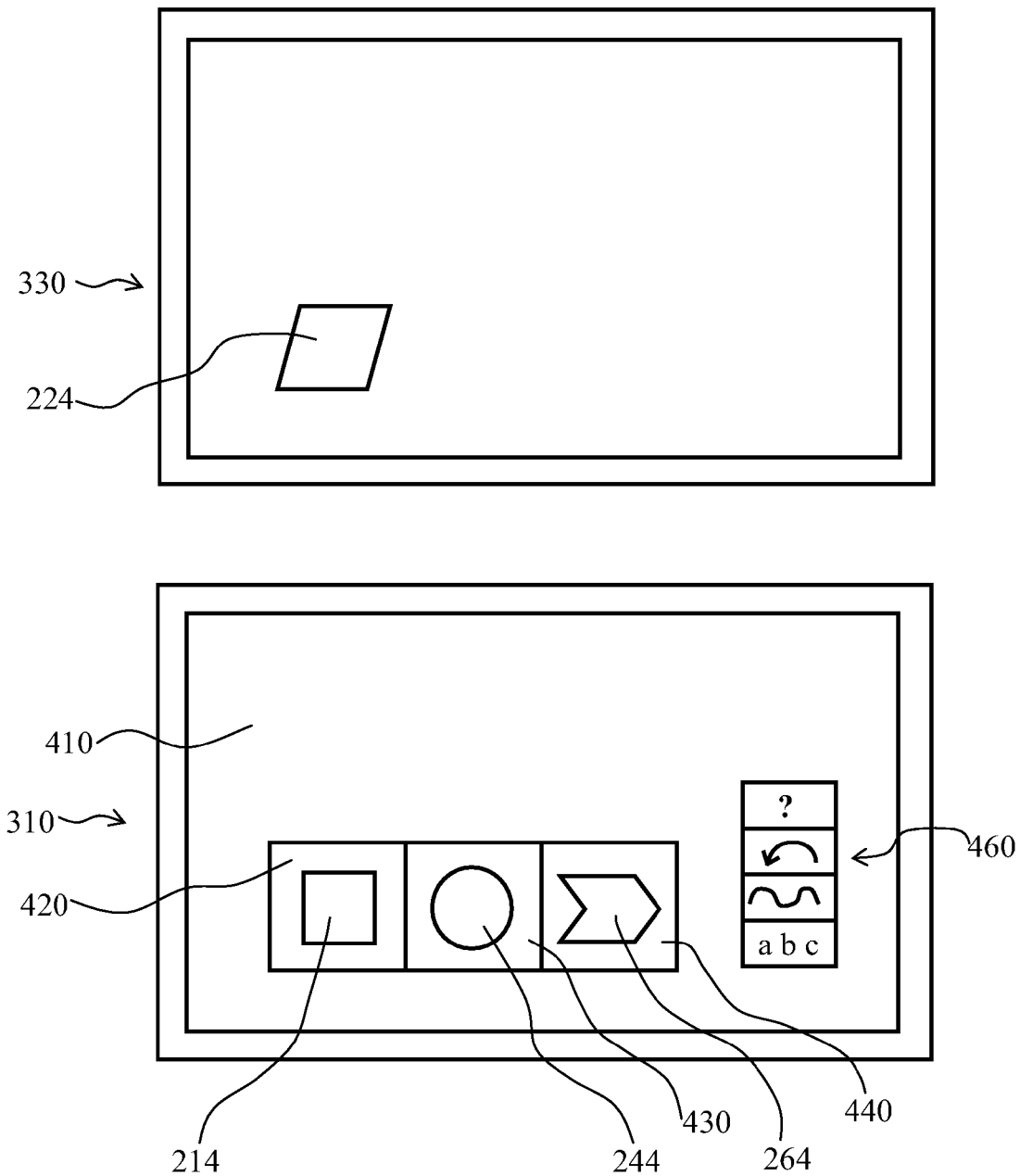

The gesture-keyboard-engine 320 electronically recognizes which of said stored gestures of the defined group is most similar to the drawn gesture 450, then identifies the desired graphical object, i.e. the parallelogram 224 associated with the recognized gesture 226 (see FIG. 2) and generates the identified graphical object in electronic form. As can be seen in FIG. 5, the display device 330 displays the generated graphical object, the parallelogram 224. At this point the user can modify the just inputted graphical object by the standard functionalities of the application, e.g. a graphic editor software, where it was entered using the digitizing tablet 310 in its mouse mode, or he or she can input a further desired graphical object.

Figure 6:
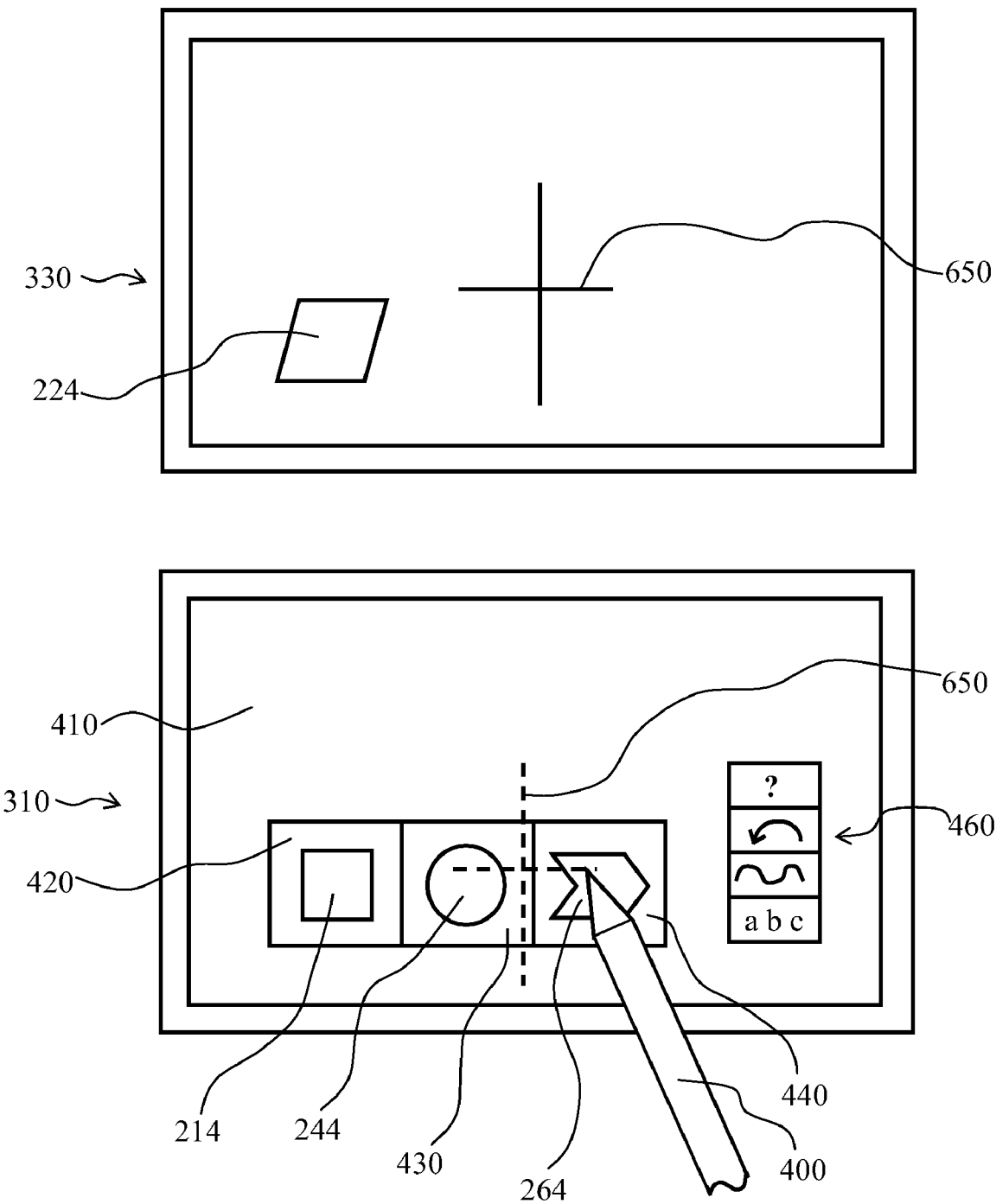
Figure 7:
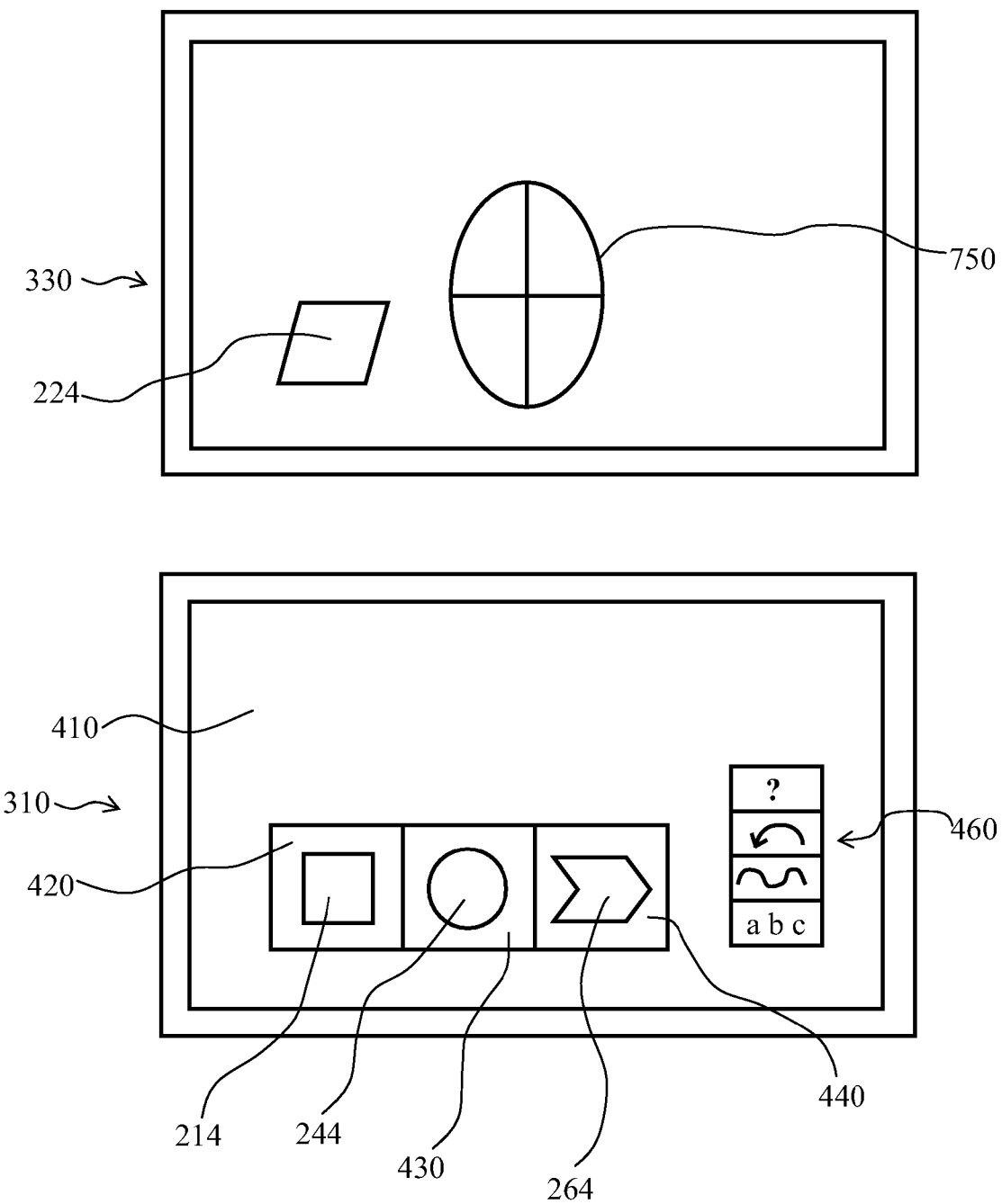

In FIGS. 6 and 7 the input of a next desired graphical object, namely a circle 250 (see FIG. 2) with two crossing lines inside is illustrated. Here, the user draws gesture 650 being similar to gesture 252 of FIG. 2 and which includes two strokes such that the starting point of the first stroke is within a region 430, whereby the circle 244 is selected as a base shape, and the corresponding group 240 is defined. When the user finishes his first stroke with the stylus 400, the digitizing tablet 310 waits for a possible next stroke for a predetermined time interval. As the user continues the drawing of the gesture 650 with the second stroke within the time interval, the digitizing tablet receives the second stroke, too and waits for the same predetermined time interval again after the second stroke has been finished. Because there is no further stroke to be received, the digitizing tablet 310 terminates the gesture input process after this predetermined time interval, and the inputting method proceeds further as it is described with reference to FIGS. 4 and 5 above.

As one can note in FIGS. 6 and 7, in this embodiment the gesture-keyboard-engine 320 extracts in addition to the shape of the gesture drawn a predefined further parameter, i.e. the size of the gesture 650 drawn by the user. The size will thus be recognized and the generation of the graphical object will be made in accordance with this extracted parameter, i.e. with the same size as the gesture 650 was drawn. In FIG. 6 it can be observed that the length of the two strokes were not identical, the graphical object generated by the gesture-keyboard-engine 320 and displayed by the display device 330 will not be a circle but an ellipse 750 with the crossing lines in it. In other embodiments the predefined parameter can be instead of the size e.g. the orientation or the direction of the gesture drawn, the latter is particularly useful in case of arrows or similar graphical objects.

The apparatus may provide other functionalities available for the user, such as help screens explaining the usage of the input method and showing the gestures that can be used in order to input the graphical objects, e.g. an undo function to remove the last inputted graphical object, a freehand drawing mode of operation that facilitates the inputting of handwritten text or freehand drawings (being bitmap images or converted to vector based graphics) as is or some known character recognizer function to input character information when no keyboard is available. These functionalities may be accessible e.g. by tapping on appropriate icons 460 on the active surface 410 of the digitizing tablet 310.

Various embodiments can be implemented in software, which may be run in the environment shown in FIG. 8 (to be described below) or in any other suitable computing environment. The embodiments are operable in a number of general-purpose or special-purpose computing environments. Some computing environments include personal computers, general-purpose computers, server computers, hand-held devices (including, but not limited to, telephones and personal digital assistants [PDAs] and tablet PCs of all types), laptop devices, multi-processors, microprocessors, set-top boxes, programmable consumer electronics, network computers, minicomputers, mainframe computers, distributed computing environments and the like to execute code stored on a computer-readable medium. The embodiments may be implemented in part or in whole as machine-executable instructions, such as program modules that are executed by a suitable computing platform. Generally, program modules include routines, programs, objects, components, data structures, and the like to perform particular tasks or to implement particular abstract data types. In a distributed computing environment, program modules may be located in local or remote storage devices.

Although the flowchart illustrating method 100 includes steps 110 to 190, that are arranged serially in the exemplary embodiment, other embodiments of the subject matter may execute two or more steps in parallel, using multiple processors or a single processor organized as two or more virtual machines or sub-processors. Moreover, still other embodiments may implement the steps by means of two or more specific interconnected hardware modules with related control and data signals communicated between and through the modules, or as portions of an application-specific integrated circuit. Thus, the exemplary flowchart is applicable to software, firmware, and/or hardware implementations.

Figure 8:
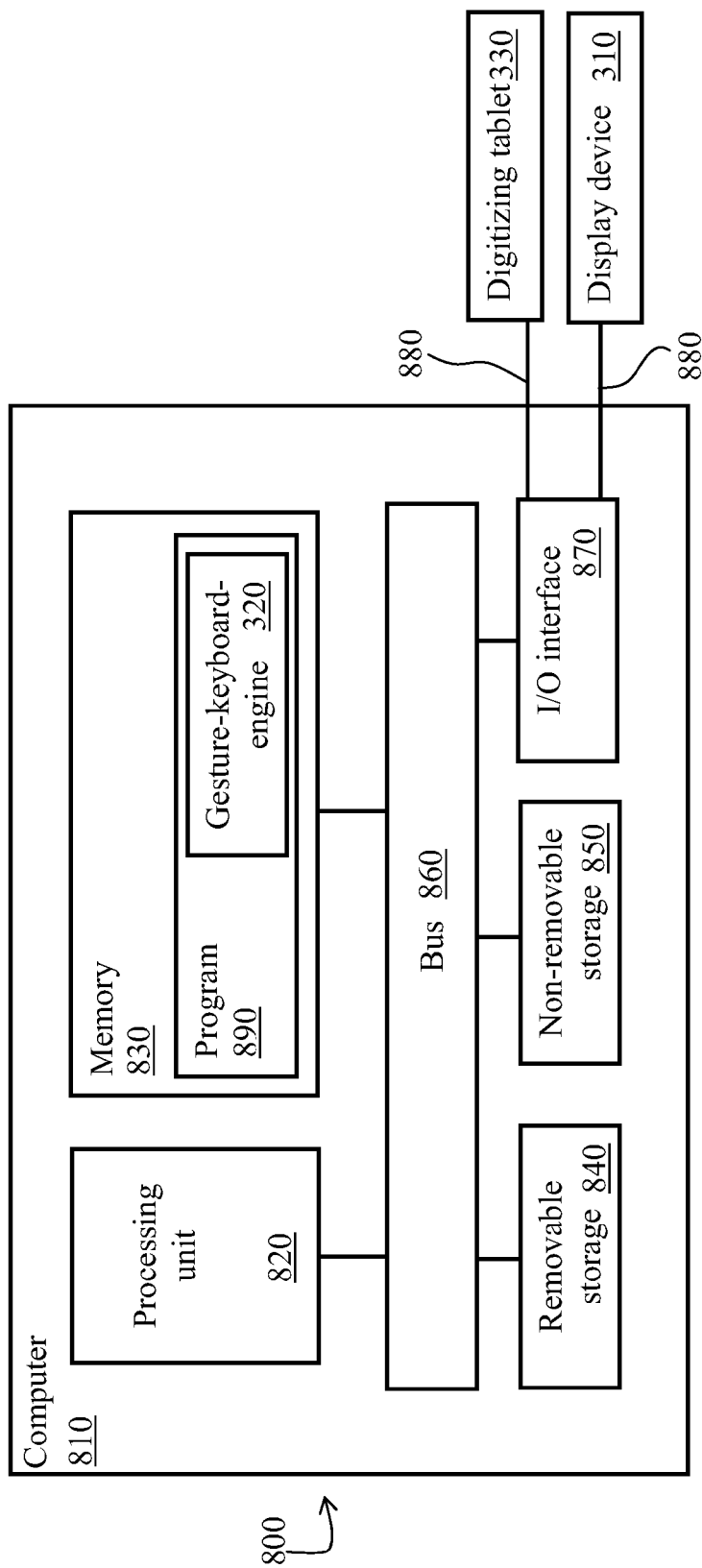
FIG. 8 is a block diagram of a typical computer system used for performing selected functions related to entering graphical objects according to an embodiment of the present invention, such as the one shown in FIGS. 1 to 7.

FIG. 8 shows block diagram 800 of a suitable computing system environment for implementing most of the embodiments. FIG. 8 and the following discussion are intended to provide a brief, general description of a suitable computing environment, in which certain embodiments of the inventive concepts contained herein may be implemented.

A general computing device, in the form of a computer 810, may include a processing unit 820, memory 830, removable storage 840, non-removable storage 850, a bus 860 and an I/O interface 870. Computer 810 may include one or more input devices, one or more output devices, and one or more communication connections 880 between the I/O interface 870 and the one or more input devices and one or more output devices. One of the input devices is the digitizing tablet 330, and the others can be e.g. mice, joysticks, and keyboards. One of the output devices is the display device 310 that can be e.g. a computer monitor, a TV screen, a plasma display, or an LCD. The computer 810 may operate in a networked environment using the network interface (not shown) to connect to one or more remote computers. A remote computer may include a personal computer, server, router, network PC, a peer device or other network node, and/or the like. The communication connection may include a Local Area Network (LAN), a Wide Area Network (WAN) and/or other networks.

The memory 830 may include volatile memory and non-volatile memory. A variety of computer-readable media may be stored in and accessed from the memory elements of computer 810. Computer memory elements can include any suitable memory device(s) for storing data and machine-readable instructions, such as read only memory (ROM), random access memory (RAM), erasable programmable read only memory (EPROM), electrically erasable programmable read only memory (EEPROM), hard drive, removable media drive for handling compact disks (CDs), digital versatile disks (DVDs), diskettes, magnetic tape cartridges, memory cards and the like; chemical storage; biological storage; and other types of data storage. "Processor" or "processing unit," as used herein, means any type of computational circuit, such as, but not limited to, a microprocessor, a microcontroller, a complex instruction set computing (CISC) microprocessor, a reduced instruction set computing (RISC) microprocessor, a very long instruction word (VLIW) microprocessor, explicitly parallel instruction computing (EPIC) microprocessor, a graphics processor, a digital signal processor, or any other type of processor or processing circuit. The term also includes embedded controllers, such as generic or programmable logic devices or arrays, application specific integrated circuits, single-chip computers, smart cards, and the like.

Embodiments may be implemented in conjunction with program modules, including functions, procedures, data structures, application programs, etc., for performing tasks, or defining abstract data types or low-level hardware contexts.

Machine-readable instructions stored on any of the above-mentioned storage media are executable by the processing unit 820 of the computer 810. For example, a computer program 890 may include machine-readable instructions capable of inputting graphical objects according to the teachings and herein described embodiments of the present invention. In one embodiment, the computer program 890 may be included on a CD-ROM and loaded from the CD-ROM to a hard drive. The machine-readable instructions cause the computer 810 to display graphical objects according to the various embodiments of the present invention. As shown in FIG. 8, the program 890 includes a gesture-keyboard-engine 320 that receives said associated digital data relating to the base shape selection and the gesture drawn and generates the desired graphical object.

In operation, a base shape from a plurality of base shapes is selected using one of the input devices, e.g. the digitizing tablet 330 and a gesture drawn by a user onto the active surface of the digitizing tablet 330 is received. Digital data associated with the selection and with the gesture drawn is inputted into the gesture-keyboard-engine 320. The gesture-keyboard-engine 320 then generates the desired graphical object upon inputting the associated digital data. The generated desired graphical object is then displayed on the display device 310. The technique of inputting a desired graphical object from a large plurality of predetermined graphical objects by using a digitizing tablet by means of gesture-selection into a computer according to the various embodiments is described in more detail with reference to FIGS. 1 to 8.

The graphical object input technique in accordance with an embodiment is modular and flexible in terms of usage in the form of a "Distributed Configurable Architecture". As a result, parts of the apparatus may be placed at different points of a network, depending on the model chosen. For example, the gesture-keyboard-engine 320 can be deployed in a server and the input and output devices streamed over from a client to the server and back, respectively. The gesture-keyboard-engine 320 can also be placed on each client, with the database management centralized. Such flexibility allows faster deployment to provide a cost effective solution to changing business needs.

The above-described method, apparatus, and system make existing applications manipulating graphical objects easier to use. This technique is a practical and natural way to input a wide variety of graphical objects.

The above-described method and apparatus provide various embodiments for the inputting of graphical objects into an electronic system. It is to be understood that the above description is intended to be illustrative, and not restrictive. Many other embodiments will be apparent to those of skill in the art upon reviewing the description supra. The system and method of the present invention is adaptable to a variety of applications and many types of devices. Thus, mobile phones, PDAs, handheld PCs, laptop computers, tablet PCs and many other small devices can take advantage of the graphical object input according to the various embodiments of the present invention. The scope of the subject matter should, therefore, be determined with reference to the following claims, along with the full scope of equivalents to which such claims are entitled.

As shown herein, the present invention can be implemented in a number of different embodiments, including various methods, an apparatus, a computer system, and an article including a machine-accessible storage medium having associated instructions.

Other embodiments will be readily apparent to those of ordinary skill in the art. The elements, algorithms, and sequence of operations can all be varied to suit particular requirements. The operations described above with respect to the method illustrated in FIG. 1 can be performed in a different order from those shown and described herein.

FIGS. 2 to 8 are merely representational and are not drawn to scale. Certain proportions thereof may be exaggerated, while others may be minimized. FIGS. 1 to 8 illustrate various embodiments of the invention that can be understood and appropriately carried out by those of ordinary skill in the art.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of the embodiments of the invention, with each claim standing on its own as a separate embodiment.

What is claimed is:

1. A method for inputting a desired graphical object from a large plurality of predetermined graphical objects, comprising the steps of:
   (i) preparing said graphical objects for gesture-selection, wherein said preparation comprises the steps of:
   (a) assigning each of said graphical objects into one of a plurality of groups in accordance with a predetermined similarity criterion, wherein the number of said groups is much less than the number of said graphical objects;
   (b) associating respective base shapes to each of said groups, wherein said base shapes have a certain degree of similarity to the objects assigned to the associated group according to said similarity criterion;
   (c) associating in each of said groups at least one gesture to each of said graphical objects, so that within any group the associated gestures are distinguishable from each other;
   (d) electronically storing said assignments of said graphical objects to said groups and for each group said association of said objects to said gestures;
   (ii) selecting said desired graphical object comprising the steps of:
   (e) selecting a base shape from the plurality of base shapes by activating a region belonging to the base shape and defining thereby the group to which said desired graphical object is assigned;
   (f) drawing a gesture on a digitizing tablet similar to the gesture associated with said desired graphical object upon selecting the base shape, and wherein the gesture resembles actual shape of said desired graphical object or a feature thereof, wherein said drawn gesture comprises more than one stroke, and after receiving the selection of a base shape, the digitizing tablet:
(a) receives a stroke;
(b) waits for a next stroke for a predetermined time interval;
(c) repeats steps (a) and (b) if there is a next stroke to be received within said predetermined time interval;
(d) terminates the gesture-reception if no further stroke is made within said predetermined time interval;
(g) electronically recognizing which of said stored gestures belonging to the defined group is most similar to said drawn gesture;
(h) identifying the desired graphical object associated with said recognized gesture; and
(j) generating the identified graphical object in electronic form.

2. The method as claimed in claim 1, further comprising the step of outputting said generated graphical object to an electronic system for processing.

3. The method as claimed in claim 1, wherein each graphical object in any given group is more similar to the base shape of that group than to the base shape of any other group.

4. The method as claimed in claim 1, wherein the graphical objects in any given group are more similar to each other than to any graphical objects of any other group.

5. The method as claimed in claim 1, further comprising the step of assigning respective regions of an active region of the digitizing tablet to said base shapes and said base shape selection step (e) further comprising activating said assigned region of the active surface of the digitizing tablet.

6. The method as claimed in claim 1, further comprising:
extracting a predefined parameter of said drawn gesture in said recognizing step (g); and
generating said graphical object in accordance with said extracted parameter in said step (j).

7. The method as claimed in claim 6, wherein said predefined parameter is selected from the group comprising size, orientation and direction.

8. The method as claimed in claim 1, further comprising repeating steps (e) to (j) to input a further graphical object.

9. An article comprising:
a storage medium having instructions that, when executed by a computing platform, result in execution of a method for inputting a desired graphical object from a large plurality of predetermined graphical objects, wherein each of said graphical objects is assigned into one of a plurality of groups in accordance with a predetermined similarity criterion, wherein the number of said groups is much less than the number of said graphical objects;
respective base shapes are associated to each of said groups, wherein said base shapes have a certain degree of similarity to the objects assigned to the associated group according to said similarity criterion;
in each of said groups at least one gesture is associated to each of said graphical objects, so that within any group the associated gestures are distinguishable from each other;
said assignments of said graphical objects to said groups and for each group said association of said objects to said gestures is being stored;
wherein said method comprises the steps of:
(a) receiving a selection of a base shape from the plurality of base shapes by activating a region belonging to the base shape and defining thereby the group to which said desired graphical object is assigned;
(b) receiving a gesture drawn via a digitizing tablet upon selecting the base shape, and wherein the gesture resembles actual shape of said desired graphical object or a feature thereof, wherein said drawn gesture comprises more than one stroke, and after receiving the selection of a base shape, the digitizing tablet:
(a) receives a stroke;
(b) waits for a next stroke for a predetermined time interval;
(c) repeats steps (a) and (b) if there is a next stroke to be received within said predetermined time interval;
(d) terminates the gesture-reception if no further stroke is made within said predetermined time interval;
(c) electronically recognizing which of said stored gestures belonging to the defined group is most similar to said drawn gesture;
(d) identifying the desired graphical object associated with said recognized gesture; and
(e) generating the identified graphical object in electronic form.

10. The article as claimed in claim 9, wherein said storage medium having further instructions that, when executed by said computing platform, result in outputting said generated graphical object to an electronic system for processing.

11. The article as claimed in claim 9, wherein each graphical object in any given group is more similar to the base shape of that group than to the base shape of any other group.

12. The article as claimed in claim 9, wherein the graphical objects in any given group are more similar to each other than to any graphical objects of any other group.

13. The article as claimed in claim 9, wherein said storage medium having further instructions that, when executed by said computing platform, result in:
extracting a predefined parameter of said drawn gesture in said recognizing step (c); and
generating said graphical object in accordance with said extracted parameter in said step (e).

14. The article as claimed in claim 13, wherein said extracted parameter is selected from the group comprising size, orientation and direction.

15. The article as claimed in claim 9, wherein said storage medium having further instructions that, when executed by said computing platform, result in repeating steps (a) to (e) to input a further graphical object.

16. An apparatus for inputting a desired graphical object from a large plurality of predetermined graphical objects, wherein each of said graphical objects is assigned into one of a plurality of groups in accordance with a predetermined similarity criterion, wherein the number of said groups is much less than the number of said graphical objects;
respective base shapes are associated to each of said groups, wherein said base shapes have a certain degree of similarity to the objects assigned to the associated group according to said similarity criterion;
in each of said groups at least one gesture is associated to each of said graphical objects, so that within any group the associated gestures are distinguishable from each other;
said assignments of said graphical objects to said groups and for each group said association of said objects to said gestures is being electronically stored;
the apparatus comprising:
a digitizing tablet for receiving a selection of a base shape from the plurality of base shapes by activating a region belonging to the base shape and defining thereby the group to which said desired graphical object is assigned and receiving a gesture drawn thereon upon selecting the base shape, and wherein the gesture resembles actual shape of said desired graphical object or a feature thereof, wherein said drawn gesture comprises more than one stroke, and after receiving the selection of a base shape, the digitizing tablet:
(a) receives a stroke;
(b) waits for a next stroke for a predetermined time interval;
(c) repeats steps (a) and (b) if there is a next stroke to be received within said predetermined time interval;
(d) terminates the gesture-reception if no further stroke is made within said predetermined time interval;
a gesture-keyboard-engine coupled to the digitizing tablet for receiving digital data associated with said defined group and with the gesture from the digitizing tablet, electronically recognizing which of said stored gestures belonging to the defined group is most similar to said drawn gesture, identifying the desired graphical object associated with said recognized gesture and generating the identified graphical object in electronic form; and
a display device coupled to the gesture-keyboard-engine for displaying the generated graphical object.

17. The apparatus as claimed in claim 16, wherein respective regions of an active region of the digitizing tablet are assigned to said base shapes and said base shape selection further comprises activating said assigned region of the active surface of the digitizing tablet.

18. The apparatus as claimed in claim 17, wherein the assigned base shapes are displayed within the respective region of the active surface of the digitizing tablet.

19. The apparatus as claimed in claim 17, wherein said activation further comprises tapping within the respective region of the active surface of the digitizing tablet.

20. The apparatus as claimed in claim 17, wherein said activation step further comprises starting the drawing of the gesture within the respective region of the active surface of the digitizing tablet.

21. The apparatus as claimed in claim 16, wherein the display device displays the gesture for the time while it is being drawn.

22. The apparatus as claimed in claim 16, wherein the display device is selected from the group comprising a computer monitor, a screen of a television set, a liquid crystal display, a plasma display, a touch screen and the displays of a PDA device, a tablet PC, and other mobile computing and telecommunication devices.

23. The apparatus as claimed in claim 22, wherein the digitizing tablet comprises a touch sensitive surface and a stylus.

24. The apparatus as claimed in claim 23, wherein the touch sensitive surface is selected from the group comprising the active surfaces of an electronic tablet, a PDA device, a tablet PC and a touch screen.

25. A computer system for inputting a desired graphical object from a large plurality of predetermined graphical objects, wherein
each of said graphical objects is assigned into one of a plurality of groups in accordance with a predetermined similarity criterion, wherein the number of said groups is much less than the number of said graphical objects;
respective base shapes are associated to each of said groups, wherein said base shapes have a certain degree of similarity to the objects assigned to the associated group according to said similarity criterion;
in each of said groups at least one gesture is associated to each of said graphical objects, so that within any group the associated gestures are distinguishable from each other;
said assignments of said graphical objects to said groups and for each group said association of said objects to said gestures is being electronically stored;
the computer system comprising:
a processing unit;
a memory coupled to the processing unit;
an I/O interface;
a digitizing tablet for receiving a selection of a base shape from the plurality of base shapes by activating a region belonging to the base shape and defining thereby the group to which said desired graphical object is assigned and receiving a gesture drawn thereon upon selecting the base shape, and wherein the gesture resembles actual shape of said desired graphical object or a feature thereof, wherein said drawn gesture comprises more than one stroke, and after receiving the selection of a base shape, the digitizing tablet:
(a) receives a stroke;
(b) waits for a next stroke for a predetermined time interval;
(c) repeats steps (a) and (b) if there is a next stroke to be received within said predetermined time interval;
(d) terminates the gesture-reception if no further stroke is made within said predetermined time interval;
a gesture-keyboard-engine coupled to the digitizing tablet for receiving digital data associated with said defined group and with the gesture from the digitizing tablet, electronically recognizing which of said stored gestures belonging to the defined group is most similar to said drawn gesture, identifying the desired graphical object associated with said recognized gesture and generating the identified graphical object in electronic form; and
a display device coupled to the gesture-keyboard-engine for displaying the generated graphical object.

26. The computer system as claimed in claim 25, wherein respective regions of an active region of the digitizing tablet are assigned to said base shapes and said base shape selection is carried out by activating said assigned region of the active surface of the digitizing tablet.

27. The computer system as claimed in claim 26, wherein the assigned base shapes are displayed within the respective region of the active surface of the digitizing tablet.

28. The computer system as claimed in claim 26, wherein said activation is carried out by tapping within the respective region of the active surface of the digitizing tablet.

29. The computer system as claimed in claim 26, wherein said activation step is carried out by starting the drawing of the gesture within the respective region of the active surface of the digitizing tablet.

30. The computer system as claimed in claim 25, wherein the display device is selected from the group comprising a computer monitor, a screen of a television set, a liquid crystal display, a plasma display, a touch screen and the displays of a PDA device, a tablet PC, and other mobile computing and telecommunication devices.

31. The computer system as claimed in claim 30, wherein the digitizing tablet comprises a touch sensitive surface and a stylus.

32. The computer system as claimed in claim 31, wherein the touch sensitive surface is selected from the group comprising the active surfaces of an electronic tablet, a PDA device, a tablet PC and a touch screen.

* * * * *